US012712372B2

(12) United States Patent
Deighton et al.

(10) Patent No.: US 12,712,372 B2
(45) Date of Patent: Aug. 18, 2026

(54) POWER STATION SYSTEMS INCLUDING MODULAR POWER STORAGE SYSTEMS

(71) Applicant: Pelican Products, Inc., Torrance, CA (US)

(72) Inventors: Kevin John Deighton, Torrance, CA (US); Scott Alan Ramsay, Rolling Hills Estates, CA (US)

(73) Assignee: PELICAN PRODUCTS, INC., Torrance, CA (US)

(*) Notice: Subject to any disclaimer, the term of this patent is extended or adjusted under 35 U.S.C. 154(b) by 867 days.

(21) Appl. No.: 17/891,992

(22) Filed: Aug. 19, 2022

(65) Prior Publication Data

US 2023/0123166 A1 Apr. 20, 2023

Related U.S. Application Data

(60) Provisional application No. 63/255,924, filed on Oct. 14, 2021.

(51) Int. Cl.

| | |
|---|---|
| ***H02J 7/70*** | (2026.01) |
| ***H01M 10/42*** | (2006.01) |
| ***H01M 50/233*** | (2021.01) |
| ***H01M 50/262*** | (2021.01) |
| ***H02J 7/34*** | (2006.01) |
| ***H02J 9/04*** | (2006.01) |

(52) U.S. Cl.

CPC ............. *H02J 7/70* (2026.01); *H01M 10/425* (2013.01); *H01M 50/233* (2021.01); *H01M 50/262* (2021.01); *H02J 7/342* (2020.01); *H02J 9/04* (2013.01)

(58) Field of Classification Search

CPC ...... H02J 7/70; H01M 10/425; H01M 50/262; H01M 50/233

See application file for complete search history.

(56) References Cited

U.S. PATENT DOCUMENTS

| | | | | |
|---|---|---|---|---|
| 6,350,040 | B1 | 2/2002 | Parker | |
| 7,470,036 | B2 | 12/2008 | Deighton et al. | |
| 7,484,858 | B2 | 2/2009 | Deighton et al. | |
| 9,074,739 | B2 | 7/2015 | Deighton et al. | |
| 10,107,463 | B1 | 10/2018 | Hanwell | |
| 2018/0006470 | A1* | 1/2018 | Stacey | F21L 4/085 |
| 2020/0313128 | A1* | 10/2020 | Schnakenberg | H01M 50/258 |
| 2021/0376635 | A1* | 12/2021 | Luangrath | H02J 7/00032 |

* cited by examiner

*Primary Examiner* — Richard V Muralidar

(74) *Attorney, Agent, or Firm* — Nelson Mullins Riley & Scarborough LLP

(57) ABSTRACT

Systems, apparatuses, and methods are described herein for a power storage system, including a power storage configured to store electric power, a power output device operatively coupled to the power storage, wherein the power output device is configured to provide the electric power stored in the power storage to one or more power-consuming devices, a first power transfer component configured to receive the electric power from a power source, a second power transfer component configured to transfer the electric power to another power storage system, and a housing structurally supporting the power storage, the power output device, the first power transfer component, and the second power transfer component.

12 Claims, 10 Drawing Sheets

Power Storage System 103

Connection 127

Housing 101

Power Storage System 100

Second Power Transfer Component 125

Network Device 150

Tracking Device 160

Power Storage 110

Power Manager 115

Power Source 121

Connection 122

First Power Transfer Component 120

Power Output Device 130

User Interface 140

Connection 105

Power-Consuming Devices 102

POWER STATION SYSTEMS INCLUDING MODULAR POWER STORAGE SYSTEMS

CROSS-REFERENCE TO RELATED PATENT APPLICATIONS

This application claims priority from U.S. Provisional Patent Application No. 63/255,924, filed Oct. 14, 2021, the entire contents of which are incorporated by reference herein.

BACKGROUND

Mobile or portable power stations can be flexibly positioned to provide ad hoc power to power-consuming devices that are located beyond the reach of power grids. Notably, mobile or portable power stations can provide power for outdoor broadcasts, constructions, military operations, disaster relief efforts, filming, consumer uses, and so on. However, conventional mobile or portable power stations such as portable diesel generators suffer from various drawbacks.

For example, portable diesel generators convert diesel fuel into electric power and emit toxic exhaust gases in the process, thus creating a heavy carbon footprint. When operating, portable diesel generators are also noisy. The toxic exhaust gases and the noise pollute the surroundings of the portable diesel generators, making them unattractive choices for filming or any indoor use. Diesel generators are also inconvenient given that they must be fueled prior to installation and refueled offsite.

In addition, long cables may be required to connect conventional mobile or portable power stations to the power-consuming devices to accommodate the placement of the power-consuming devices and to avoid the exhaust gases and the noise. Long cables are a trip hazard liability and require cable covers throughout pedestrian areas. Temporary barricades and active policing may be required to separate crowds from the power stations and the cables while such power stations are being deployed.

Moreover, significant voltage drops can be experienced across long cables. Therefore, long cables require more power than necessary to adequately supply the power-consuming devices, leading to waste. Setting up conventional mobile or portable power stations is labor-intensive in that, for a single deployment, complicated and lengthy cable routes need to be laid out to route the cables to a single position at which the conventional mobile or portable power station is located. Such issues increase deployment costs.

SUMMARY

In some arrangements, a power storage system includes a power storage configured to store electric power, a power output device operatively coupled to the power storage, wherein the power output device is configured to provide the electric power stored in the power storage to one or more power-consuming devices, a first power transfer component configured to receive the electric power from a power source, a second power transfer component configured to transfer the electric power to another power storage device; and a housing structurally supporting the power storage, the power output device, the first power transfer component, and the second power transfer component.

In some arrangements, a power storage system includes a platform configured to support a plurality of power storage systems, each of the plurality of power storage systems includes a power storage configured to store electric power, a power output device operatively coupled to the power storage, the power output device is configured to provide the electric power stored in the power storage to one or more power-consuming devices, a first power transfer component configured to receive the electric power from a power source, a second power transfer component configured to transfer the electric power to another power storage system, and a housing structurally supporting the power storage, the power output device, the first power transfer component, and the second power transfer component.

DETAILED DESCRIPTION

The construction and arrangement of the systems and methods as shown in the various exemplary arrangements are illustrative only. Although only a few arrangements have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary arrangements without departing from the scope of the present disclosure.

Referring generally to the FIGS., the present application relates to systems, apparatuses, methods, and non-transitory computer-readable media concerning power station systems that are configured to provide electric power to various power-consuming devices that consume the electric power. The power station systems described herein can provide portable, off-the-grid, sustainable, clean energy, such as those generated via renewable energy (e.g., solar, wind, hydroelectric, geothermal, etc.). In certain examples, such a power station system can be configured as an ecosystem of multiple modular, portable power storage systems (e.g., battery packs) that can be charged and recharged using renewable energy or other forms of energy. The power storage systems are separate units, each of which can provide power independently. In particular examples, each power storage system has a size and shape that facilitate portability and placement in various possible environments of use. In particular examples, two or more power storage systems can be removably abutted or attached to one another, such that a first power storage system can charge a second power storage system while the second power storage system continues to be connected to the power-consuming devices, to allow charging of power storage systems while also providing continuous power to the power-consuming devices. Accordingly, the power station systems described herein can replace conventional mobile or portable power stations, especially, but not limited to such contexts as outdoor broadcasts, construction, military, disaster relief, filming locations, and consumer uses.

Figure 1:
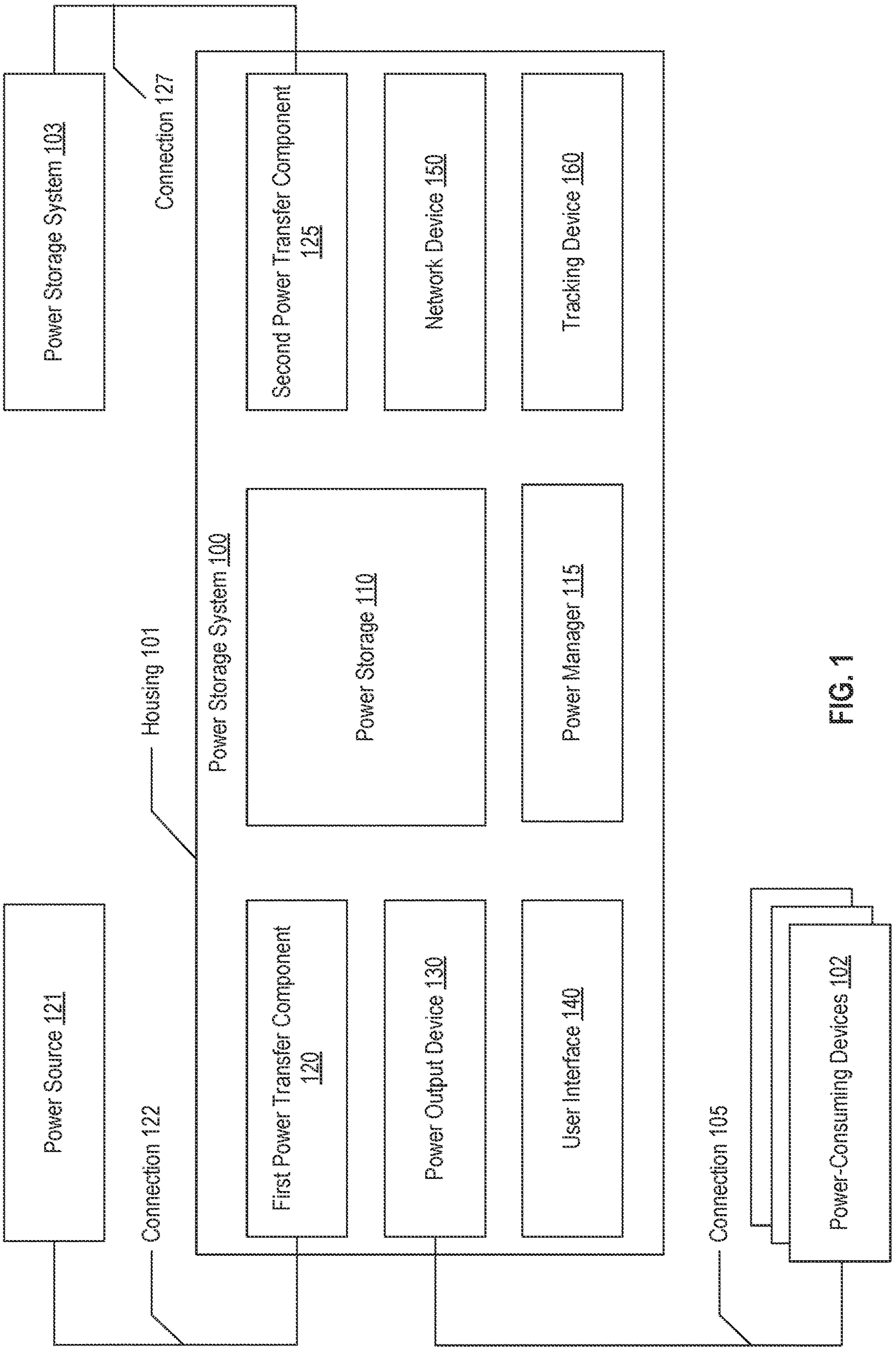
FIG. 1 is a diagram illustrating a power storage system according to some implementations.

FIG. 1 is a diagram illustrating a power storage system 100 according to some implementations. Referring to FIG. 1, the power storage system 100 includes various components such as a power storage 110, a power manager 115, a first power transfer component 120, a second power transfer component 125, a power output device 130, a user interface 140, a network device 150, and a tracking device 160. The components of the power storage system 110 are supported and protected by a housing 101. The power storage system 100 can be used to power one or more power-consuming devices 102.

The power storage 110 stores and provides electric power. In some implementations, the power storage 110 includes one or more rechargeable battery packs, e.g., Lithium ion or Lithium ion polymer battery packs. Each battery pack can store up to a defined amount of electric power, for example, but not limited to 3 KW of electric power. In other examples, each battery pack may store up to any other suitable amount of electric power. In some examples, a battery pack can include other types of rechargeable batteries, such as nickel-metal hydride batteries, nickel-iron batteries, and so on. In some implementations, the power storage 110 can include capacitors (e.g., supercapacitors, ultracapacitors, and so on) or other suitable rechargeable power storage devices. In other examples, the power storage 110 may include other types of power source, such as fuel cells (e.g., hydrogen fuel cells).

As described, the power storage 110 can be charged and recharged. The power storage 110 is operatively coupled to the first power transfer component 120 and can be charged or can receive power via the first power transfer component 120. The first power transfer component 120 can draw or receive electric power from a suitable power source 121. Examples of the power source 121 include one or more of another power storage system (such as the power storage system 100), an energy source (e.g., a solar panel, a wind turbine, connection to an electric power grid, etc.), or so on. The first power transfer component 120 includes suitable devices for wireless (e.g., inductive) or wired (e.g., conductive) transfer in and receipt of electric power. In other words, the connection 122 can be a wireless connection (e.g., by induction) or a wired connection (e.g., by conduction).

In some examples, the first power transfer component 120 includes an inductive charging unit having one or more coils such that when appropriately positioned (aligned) with respect to one or more coils of or operatively coupled to the power source 121, can receive power from the one or more coils of or operatively coupled to the power source 121 via induction. In some examples, the first power transfer component 120 includes a connector having one or more contact surfaces such that when appropriately positioned to physically contact one or more contact surfaces of a connector of or operatively coupled to the power source 121, can receive power from the one or more contact surfaces of the connector of or operatively coupled to the power source 121 via conduction.

In some implementations, the first power transfer component 120 and/or the housing 101 can include one or more engagement devices configured to engage, mate, or otherwise come in contact with one or more engagement devices of the power source 121 to appropriately position the first power transfer component 120 (and the housing 101) with respect to a complementary power transfer component of the power source 121, vice versa. Examples of the one or more engagement devices of the first power transfer component 120 and/or the housing 101 include one or more engagement surfaces, clutches, clamps, bolts, screws, pings, Velcro®, hooks, wires, flanges, guides, or another type of mechanical fastener. Likewise, examples of the one or more engagement devices of the power source 121 include one or more engagement surfaces, clutches, clamps, bolts, screws, pings, Velcro®, hooks, wires, flanges, guides, or another type of mechanical fastener. Each engagement device of the first power transfer component 120 and/or the housing 101 is complementary in shape and function to a corresponding engagement device of the power source 121.

In some examples, the power storage 110 is operatively coupled to the second power transfer component 125 and can charge or provide power via the second power transfer component 125 to another power storage system 103 (which may be similar to or the same as the power storage system 100). In other words, by virtue of the second power transfer component 125, the power storage system 100 can act like the power source 121 for the power storage system 103. The second power transfer component 125 includes a suitable device for wireless (e.g., inductive) or wired (e.g., conductive) transfer of power. In other words, the connection 127 can be a wireless connection (e.g., by induction) or a wired connection (e.g., by conduction).

In some examples, the second power transfer component 125 includes an inductive charging unit having one or more coils such that when appropriately positioned (aligned) with respect to one or more coils of the first power transfer component 120 of the power storage system 103, can provide or transfer electric power to the one or more coils of or operatively coupled to the first power transfer component 120 of the power storage system 103 via induction. In some examples, the second power transfer component 125 includes a connector having one or more contact surfaces such that when appropriately positioned to physically contact the one or more contact surfaces of a connector of or operatively coupled to the first power transfer component 120 of the power storage system 103, can provide or transfer power to the one or more contact surfaces of the connector of or operatively coupled to the first power transfer component 120 of the power storage system 103 via conduction.

In some implementations, the second power transfer component 125 and/or the housing 101 of the power storage system 100 can include one or more engagement devices configured to engage, mate, or otherwise come in contact with one or more engagement devices of the first power transfer component 125 and/or the housing 101 of the power storage system 103 to appropriately position the second power transfer component 125 (and the housing 101) of the power storage system 100 with respect to the first power transfer component 125 of the power storage system 103, vice versa. As described, examples of the one or more engagement devices of the second power transfer component 125 and/or the housing 101 include one or more engagement surfaces, clutches, clamps, bolts, screws, pings, Velcro®, hooks, wires, flanges, guides, or another type of mechanical fastener. Each engagement device of the second power transfer component 125 and/or the housing 101 of the power storage system 100 is complementary in shape and function to a corresponding engagement device of the first power transfer component 120 and/or the housing 101 of the power storage system 103.

In some arrangements, the housing 101 of the power storage system 100 includes multiple sides or surfaces, such that the first power transfer component 120 is located on, adjacent to, or exposed from a first side or surface while the second power transfer component 125 is located on, adjacent to, or exposed from a second side or surface. The first side or surface and the second side or surface are different sides or surfaces of the housing 101 in some examples. In some examples, the first side or surface and the second side or surface face different directions. In some examples, the first side or surface and the second side or surface are opposite sides or surfaces of the housing 101. In some examples, the first side or surface and the second side or surface face opposite directions. In some examples, the first power transfer component 120 and the second power transfer component 125 face different directions. In some examples, the first power transfer component 120 and the second power transfer component 125 face opposite directions. Such arrangements allow the power storage system 100 to be recharged by the power source 121 (e.g., another power storage system 100) while simultaneously recharging the power storage system 103. In addition, such arrangements allow the power storage system 100 to recharge the power storage system 103, first. Then, subsequently, when the power storage 110 of the power storage system 100 is running low on electric power, the power source 121 (e.g., another power storage system 100) can be used to charge the power storage system 100 and the power storage system 103, without moving the power storage systems 100 and 103 and without interrupting the provision of power by the power storage system 103 and the power storage system 100 to any power-consuming devices connected thereto.

The power output device 130 is operatively coupled to the power storage 110 and provides an interface between the power storage 110 and the power-consuming devices 102. The power output device 130 includes plugs, sockets, outlets, switches, adaptors, connectors, metal contacts, cables, and so on. The power output device 130 may have standard output sockets. The power-consuming devices 102 are connected to the power output device 130 to receive power stored in the power storage 110 via the connection 105. In some examples, the connection 105 is a cable with a first adapter shaped and sized to mate with a second adapter of the power output device 130. In some examples, the power output device 130 includes wireless charging devices (e.g., one or more coils) configured to wirelessly charge the power-consuming devices 102 (e.g., the connection 105 is a wireless connection). In some examples, the power output device 130 includes or is operatively coupled to an inverter that coverts DC power stored in the power storage 110 into AC power, which is provided to the power-consuming devices 102.

In some examples, each of the first power transfer component 120, the second power transfer component 125, and the power output device 130 each has a separate electrical path to the power storage 110 such that the power storage 110 can be recharged by the first power transfer component 120, recharge the power storage system 103, and provide power to the power-consuming devices 102 (or any combination thereof), simultaneously.

In some arrangements, the housing 101 of the power storage system 100 includes multiple sides or surfaces, such that the first power transfer component 120 is located on, adjacent to, or exposed from a first side or surface, the second power transfer component 125 is located on, adjacent to, or exposed from a second side or surface; and the power output device 130 is located on, adjacent to, or exposed from a third side or surface. The first side or surface, the second side or surface, and the third side or surface are different sides or surfaces of the housing 101 in some examples. In some examples, the first side or surface, the second side or surface, and the third side or surface face different directions. In some examples, two of the first side or surface, the second side or surface, and the third side or surface are opposite sides or surfaces of the housing 101. In some examples, two of the first side or surface, the second side or surface, and the third side or surface face opposite directions. In some examples, the first power transfer component 120, the second power transfer component 125, and the power output device 130 face different directions. In some examples, two of the first power transfer component 120, the second power transfer component 125, and the power output device 130 face opposite directions. Such arrangements allow the power storage system 100 to be recharged by the power source 121 (e.g., another power storage system 100) while simultaneously recharging the power storage system 103 and providing power to the power-consuming devices 102. In addition, such arrangements allow the power storage system 100 to recharge the power storage system 103 first, and then subsequently when the power storage 110 of the power storage system 100 is running low on electric power, the power source 121 (e.g., another power storage system 100) can be used to charge the power storage system 100 and the power storage system 103, without moving the power storage systems 100 and 103 and without interrupting the provision of power by the power storage system 103 and the power storage system 100 to any power-consuming devices connected thereto.

The power manager 115 is operatively coupled to the power storage 110 to manage or regulate the transfer of electrical power to the power storage system 103 and from the power source 121 and the provision of power to the power-consuming devices 102. Thus, the power manager 115 is operatively connected to the first power transfer component 120, the second power transfer component 125, and the power output device 130. In particular, the power manager 115 includes suitable components (e.g., controllers, micro-controllers, charge regulators, charge controllers, voltage regulators, inverters, surge protectors, and so on) that regulates the current and voltage of power flowing into the power storage 110 and out of the power storage 110.

In some examples, the power manager 115 determines the electric power currently stored in the power storage 110 at any given moment in time. The power manager 115 is operatively coupled to the user interface 140 and causes the user interface 140 to display the remaining electric power currently stored in the power storage 110. The user interface 140 can include display devices such as Liquid Crystal Display (LCD), Light Emitting Diode (LED), Cathode-Ray Tube (CRT), plasma, or other such digital displays, projection-based monitors, touchscreens, and so on. In some arrangements, the user interface 140 can include speakers, buzzers, audio alarms or other audio devices configured to output sound corresponding to the remaining electric power currently stored in the power storage 110. The power manager 115 can provide visual and/or audio cue to notify the operator of the remaining electric power currently stored in the power storage 110. In some examples, the power manager 115 can detect a condition of low remaining power in the power storage 110 (for example, below a preset power level threshold), and provide an audio or visual (or both) alarm or indicia, upon detection of that condition.

In some examples, the power manager 115 can determine status information of the power storage 110, including charging status, power remaining, battery health, and so on, and report the same to a central management system (e.g., a central management system 430 in FIG. 4) via the network device 150. The network device 150 may be configured to communicate wirelessly with a network, such as via Wi-Fi, Bluetooth, Near Field Communication (NFC), Zigbee, Infrared (IR), Radio Frequency (RF), cellular (3G, 4G, LTE, 5G), etc. In other examples, the network device 150 may communicate with the network via a wired connection, such as via Ethernet, a Local Area Network (LAN), a Wide Area Network (WAN), Firewire, Universal Serial Bus (USB), or other applicable wired interface. In some examples, the network device 150 allows Internet-of-Things (IoT) communication with the central management system. The network device 150 can transfer the status information to the central management system over the network. In some examples, the network device 150 can also receive commands (e.g., turn-off, start, sleep, etc.) from the central management system.

In some arrangements, the tracking device 160 is a built-in anti-theft tracking device that allows the power storage system 100 to be tracked. For example, the tracking device 160 may include a positioning device (e.g., a Global Positioning System (GPS) tracker) configured to track the current location of the power storage system 100 and provide the location to the central management system, other power storage systems, and so on.

In some arrangements, each of the components 110, 115, 120, 125, 130, 140, 150, and 160 of the power storage system 100 may include or operate with a suitable processing circuit having at least one processor and at least one memory. In some examples, two or more (or each) of the components 110, 115, 120, 125, 130, 140, 150, and 160 can be implemented with the same processing circuit. In some arrangements, one or more (or each) of the components 115, 120, 125, 130, 140, 150, and 160 are powered by the power storage 110.

The housing 101 is sized and shaped to structurally support the components 110, 115, 120, 125, 130, 140, 150, and 160 of the power storage system 100. In some arrangements, the housing 101 partially or entirely encloses one or more (or each) of the components 110, 115, 120, 125, 130, 140, 150, and 160 of the power storage system 100. In some arrangements, one or more of the components 110, 115, 120, 125, 130, 140, 150, and 160 of the power storage system 100 are partially or entirely exposed from exterior surfaces of the housing 101. In some arrangements, one or more of the components 110, 115, 120, 125, 130, 140, 150, and 160 of the power storage system 100 are attached or fixed to the interior or the exterior surfaces of the housing 101. The housing 101 can be made from one or more rigid materials including, but not limited to metal, plastic, resin, composite material, wood or the like. In particular examples, the housing 101 is made from a moldable, rigid polymer material such as a rigid synthetic plastic. In some arrangements, the housing 101 can structurally support the power source 121 such as one or more renewable energy sources (e.g., solar panels, wind turbines, and so on) on a top side of the housing 101.

Figure 2A:
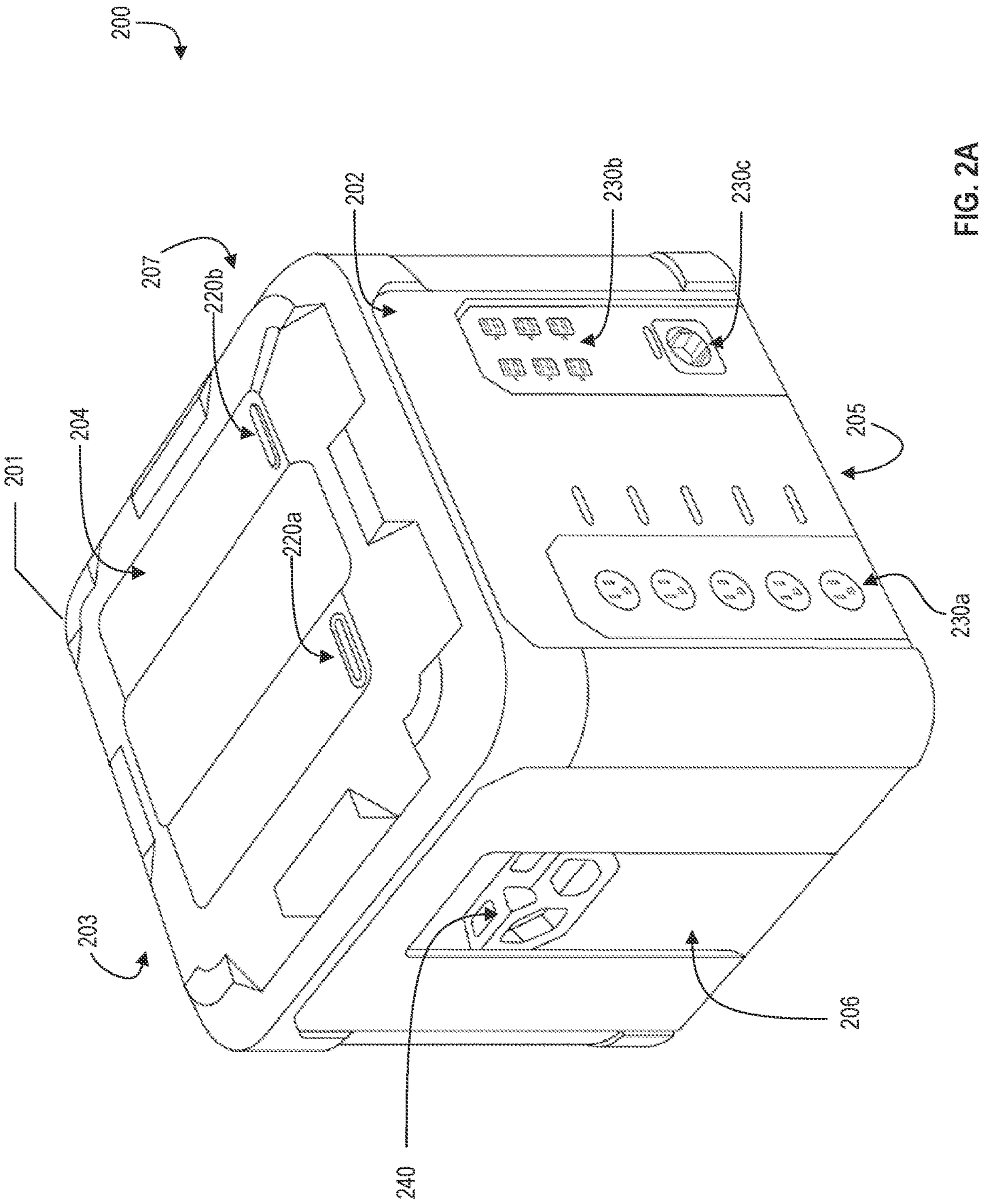
FIG. 2A shows a perspective view of a power storage system according to some implementations.
Figure 2B:
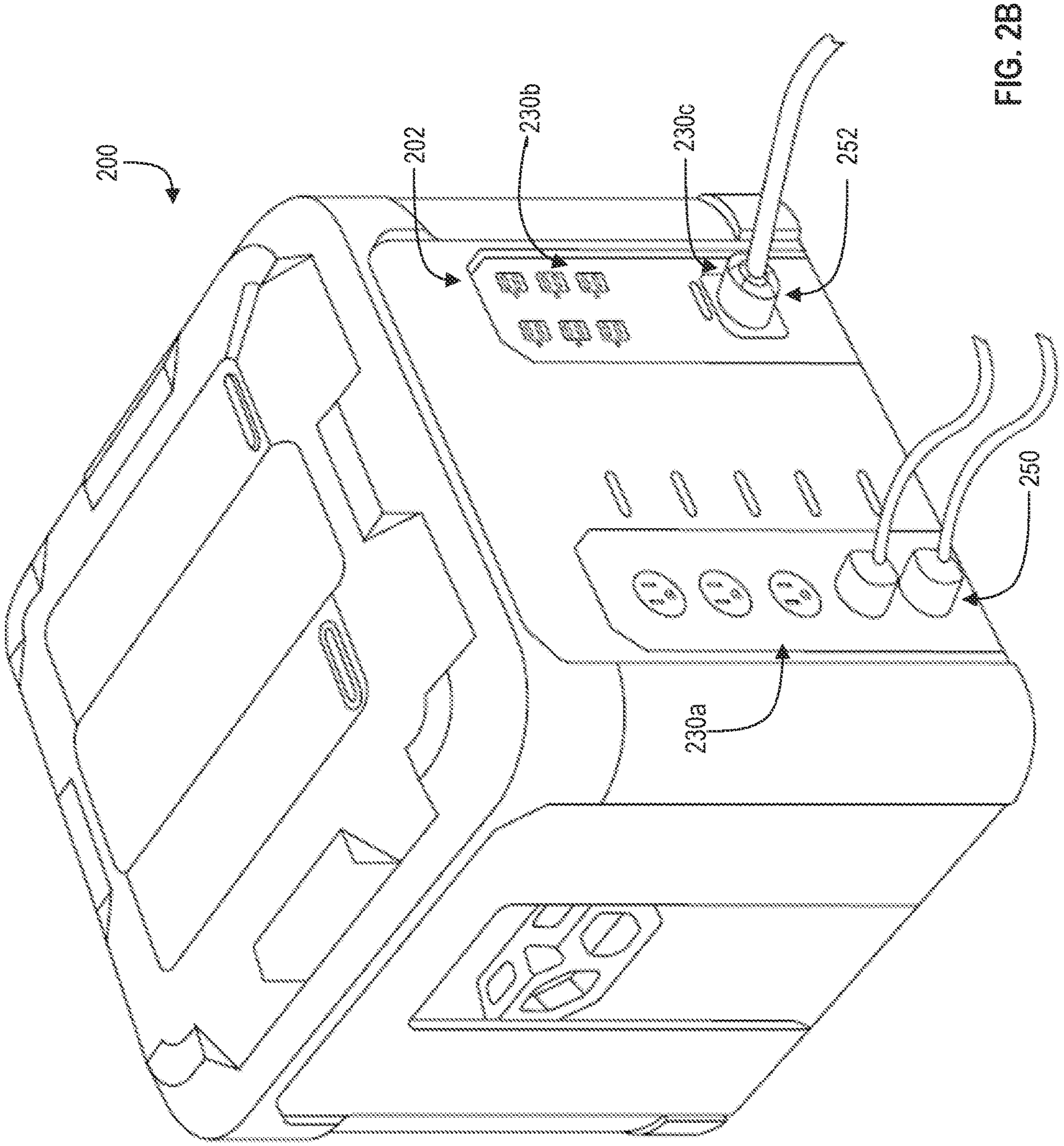
FIG. 2B shows a perspective view of a power storage system providing power to power-consuming devices according to some implementations.
Figure 3A:
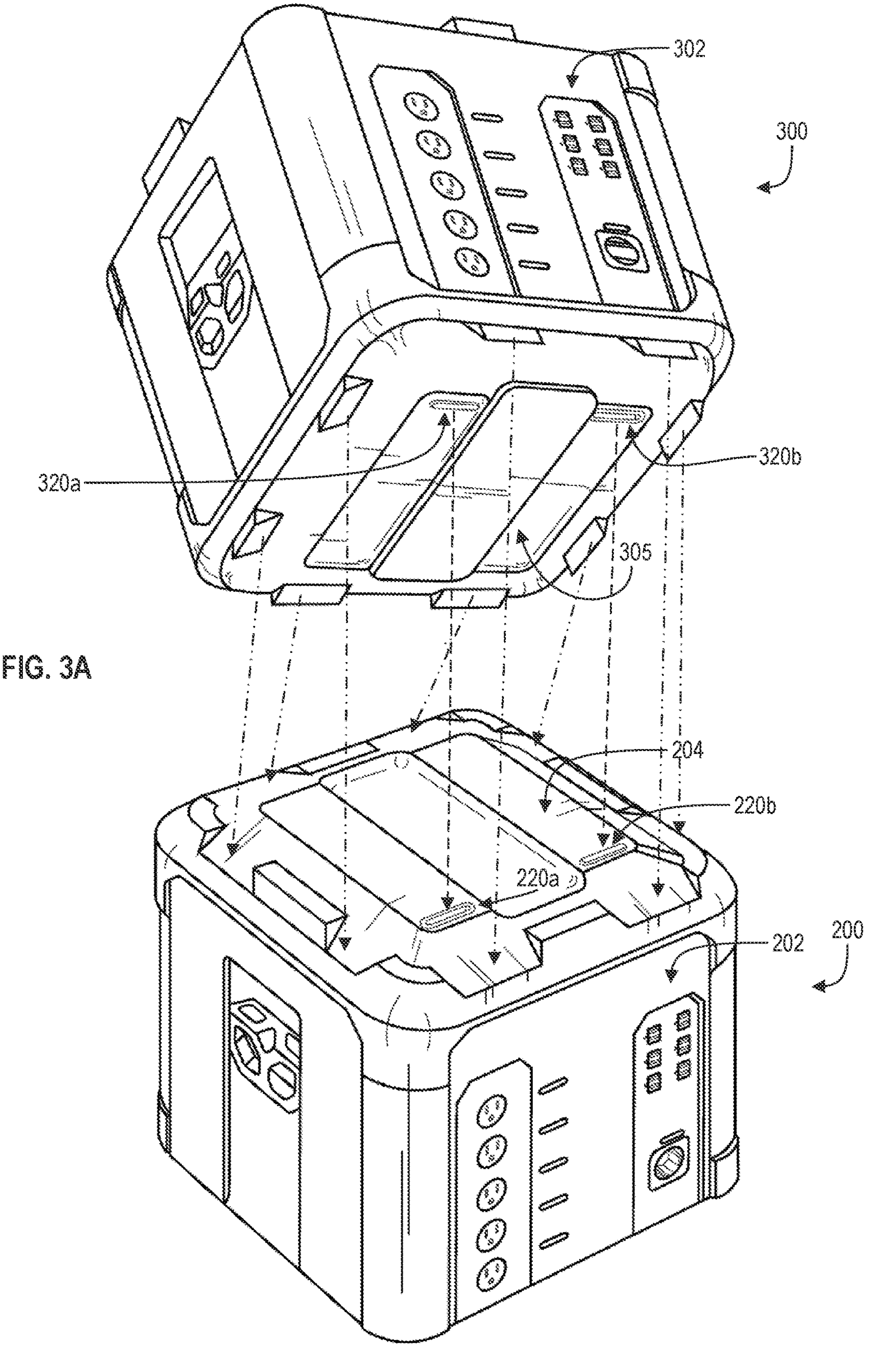
FIG. 3A shows a power transfer arrangement of two power storage systems according to some implementations.

FIG. 2A shows a perspective view of a power storage system 200 according to some implementations. FIG. 2B shows a perspective view of the power storage system 200 providing power to power-consuming devices according to some implementations. FIG. 3A shows a power transfer arrangement of two power storage systems 200 and 300 according to some implementations. Referring to FIGS. 1-2B, the power storage system 200 is an example implementation of the power storage system 100. The power storage system 200 likewise has a power storage 110, a power manager 115, a tracking device 160, and a network device 150, which are not shown in view in FIGS. 2A and 2B.

The power storage system 200 includes a housing 201, which is an example of the housing 101. As shown, the power storage system 200 (e.g., the housing 201) has a shape that is substantially a cube. In other examples, the power storage system 200 (e.g., the housing 201) has a shape that is substantially a rectangular cuboid, or the power storage system 200 (e.g., the housing 201) has a shape with at least one cross-section being a regular polygon. The housing 201 may have one or more of reinforced and protruding edge members, chamfered edges, curved edge, patterns on one or more surfaces or sides, and so on. The shape of the power storage system 200 (e.g., the housing 201) being substantially a cube, a rectangular cuboid, or a shape with at least one cross-section being a regular polygon allow multiple power storage systems 200 having the same size and shape to be conveniently stacked, positioned adjacent to one another, or positioned to contact one another to charge or recharge one another, for storage, for transportation, or for any combination thereof. In addition, such power storage systems 200, when stacked, positioned adjacent to one another, or positioned to contact one another, can conserve space.

The housing 201 has six sides or surfaces. As used herein, a side of the housing 201 on which the power output devices 230*a*, 230*b*, and 230*c* are located is referred to as a front side 202. A side opposite to the front side 202 is referred to as a back side 203. A side that is configured to face the ground when the system 200 is placed upright on the ground or on another object (e.g., another power storage system 300) is referred to as a bottom side 205. A side opposite to the bottom side 205 that is configured to face upwards when the system 200 is placed upright on the ground or on another object (e.g., another power storage system 300) is referred to as a top side 204. The remaining two sides are referred to as lateral sides 206 and 207.

The power output devices 230*a*, 230*b*, and 230*c* in FIGS. 2A and 2B are a particular example implementation of the power output device 130. Other examples may include other implementations or arrangements of power output devices. In certain examples, the power output devices 230*a* and 230*c* include multiple outlet receptacles or plug sockets (e.g. for receiving and connecting to standard AC electrical plugs). In particular examples, the power output devices 230*a* may provide a standard 110V AC power output, while the power output device 230*c* may provide a standard 220V AC power output. In certain examples, the power output devices 230*b* are multiple USB outlet sockets (e.g., for receiving standard USB plugs). In other examples, the system 200 includes other power output devices in addition to, or as an alternative to the power output devices 230*a*, 230*b* and 230*c*. In particular examples, all of the power output devices 230*a*, 230*b*, and 230*c* are located on or exposed for access from a same side (e.g., the front side 202) of the housing 201 so that a user can conveniently access different types of power output devices from one side of the system 200. The power level indicators 205 in FIGS. 2A and 2B are particular implementations of the user interface 140. Other examples may include other user interface implementations. The power level indicator 205 may include, but is not limited to one or more LEDs, meters, or other visual indicators located on the front side 202, to notify the user of the current power level of the power storage 110 of the power storage system 200. In particular examples, the power level indicator 205 includes a plurality of LEDs in a linear array (such as, but not limited to the array 205 as shown in FIG. 2A) that are operated such that the number of LEDs that are energized to light up corresponds to the amount of power remaining in the power storage 110. Accordingly, during operation, the front side 202 of the housing 201 may be positioned to be easily accessible and viewable to the user.

As shown in FIG. 2B, power-consuming devices 102 (not shown) are connected to the power output devices 230*a* and 230*c* via connector connections 250 and 252, which are examples of the connection 105. The connectors 250 are removably attached to (e.g., plugged into) the power output devices 230*a*. The connector 252 is removably attached to (e.g., plugged into) the power output device 230*c*. In particular examples as shown, one or more (or all) of the connectors 250 and 252 are connected to the power storage system 200 on the front side 202.

As shown, the lateral side 206 has a handle 240 shaped to be gripped by a user's hand. The handle 240 is configured to allow the user to lift and move the power storage system 200. The lateral side 207 likewise has a similar handle structure not shown in view. The handle structures on the lateral sides 206 and 207 may be aligned with each other, such that the user can easily and safely lift the power storage system 200 in a balanced manner. In certain examples, each handle may be located in a recess within the surface of one of the lateral sides 206 or 207. In that manner, each handle member may be recessed or flush with the rest of the surface of one of the lateral sides 206 and 207, so as to not protrude out from the side surfaces of the receptacle. Accordingly, the outer surfaces of the lateral sides 206 and 207 of the power storage system 200 may be made relatively flat, so that another (similar) power storage system 300 can be placed in side-to-side abutment or close to the side 206 or the side 207 of the power storage system 200 as possible.

The top side 204 has first power transfer components 220*a* and 220*b*, which are particular implementations of the first power transfer component 120. In certain examples, the first power transfer component 220*a* is a first electrical contact, and the first power transfer component 220*b* is a second electrical contact. The first power transfer components 220*a* and 220*b* are configured and arranged for conductive power transfer. For example, the first power transfer components 220*a* and 220*b* are configured to contact the second power transfer component 125 of another power storage system 300 in the manner described herein so that the other power storage system 300 can recharge the power storage system 200 (e.g., after the power storage system 200 has been supplying power to some power-consuming devices for some time, or has otherwise depleted its stored power). In addition or as an alternative to the first power transfer components 220*a* and 220*b*, the power storage system 200 may have inductive charging elements (e.g., one or more coils) located on or adjacent to the top side 204. In certain examples, the one or more inductive coils may be embedded within the top side 204, or otherwise partially or entirely enclosed in the top side 204 for protection, as direct contact is not required for wireless charging.

In particular examples, the top side 204 has a first shape profile or pattern that is configured to engage and mate with a shape of a bottom side of the other power storage system 300. For example, the top side 204 (e.g., the edges of the top side 204 and the surfaces enclosed by the edges) may have one or more ribs, ridges, protrusions, elevated surfaces, depressed surfaces, convex sections, concave sections, curves, arcs, channels, valleys, or other shaped feature. The first shape profile may include regular shapes, irregular shapes, symmetrical features, asymmetrical features, and so on. The first shape profile of the top side 204 of the power storage system 200 allows another power storage system 300 to be placed on top of and be supported by the power storage system 200 for power transfer. In particular examples, the power storage system 300 is identical to the power storage system 200, and description of some identical features is omitted herein for the sake of brevity.

As shown in FIG. 3A, a bottom side 305 (identical to the bottom side 205) of the power storage system 300 has a second shape profile or pattern configured to engage and mate with a shape of a top side of the other power storage system 200. For example, the bottom side 305 (e.g., the edges of the bottom side 305 and the surfaces enclosed by the edges) may have one or more ribs, ridges, protrusions, elevated surfaces, depressed surfaces, convex sections, concave sections, curves, arcs, channels, valleys, configured to mate with those or corresponding features on the top side 204 of the power storage system 200. The second shape profile may include regular shapes, irregular shapes, symmetrical features, asymmetrical features, and so on. In particular examples, the bottom side 205 of the power storage system 200 (which is not shown in view) may have the same second shape profile, such that the power storage system 200 may alternatively be stacked on top of the power storage system 300 in a manner similar to the stacking of the power storage system 300 on the power storage system 200 discussed above.

In certain examples, the bottom side 305 has second power transfer components 320*a* and 320*b*, which are particular implementations of the second power transfer component 125 of the power storage system 300. The second power transfer component 320*a* includes a third electrical contact, and the second power transfer component 320*b* includes a fourth electrical contact. The second power transfer components 320*a* and 320*b* can be used for conductive power transfer. For example, the second power transfer components 320*a* and 320*b* are configured to electrically contact the first power transfer components 220*a* and 220*b* of the power storage system 200 so that electrical power may transfer between the components and the power storage system 300 can recharge the power storage system 200. As shown, the second power transfer component 320*a* is configured to engage, mate, and/or contact the first power transfer component 220*a*, and the second power transfer component 320*b* is configured to engage, mate, and/or contact the first power transfer component 220*b*, automatically, when the bottom side 305 of the power storage system 300 is engaged or mated with the top side 204 of the power storage system 200.

The first shape profile and the second shape profile may be complementary in shape and size such that the top side 204 of the power storage system 200 and the bottom side 305 of the power storage system 300 can mate, engage, attach, fasten, or come to contact with each other to stabilize the stacking configuration of the power storage system 200 and the power storage system 300. This also allows coupling the first power transfer components 220*a* and 220*b* and the second power transfer components 320*a* and 320*b* for power transfer.

In particular examples, the ribs, ridges, protrusions, elevated surfaces, convex sections, etc. of the first shape profile are sized and shaped to fit in, engage, or mate with the depressed surfaces, concave sections, channels, valleys, etc. of the second shape profile. The ribs, ridges, protrusions, elevated surfaces, convex sections, etc. of the second shape profile are sized and shaped to fit in, engage, or mate with the depressed surfaces, concave sections, channels, valleys, etc. of the first shape profile.

In the illustrated example, the second shape profile includes protrusions or ridges on the edges of the bottom side 305 that are shaped and sized to fit into valleys or channels of the first shape profile, e.g., on the edges of the top side 204 when the protrusions or ridges of the bottom side 305 vertically align with the valleys or channels of the top side 204. The first shape profile includes protrusions or ridges on the edges of the top side 204 that are shaped and sized to fit into valleys or channels of the first shape profile, e.g., on the edges of the bottom side 305 when the protrusions or ridges of the bottom side 305 vertically align with the valleys or channels of the top side 204. The vertical direction is defined by direction traversing or perpendicular to the top side 204 and the bottom side 205.

In addition, the second shape profile includes a center portion of the bottom side 305 that has three rectangular portions, where a center rectangular portion (which is between two side rectangular portions) protrudes outwards with respect to the two side rectangular portions. The two side rectangular portions of the bottom side 305 are recessed with respect to the center rectangular portion. On the other hand, the first shape profile includes a center portion of the top side 204 that has three rectangular portions, where a center rectangular portion (which is between two side rectangular portions) is recessed with respect to the two side rectangular portions. The two side rectangular portions of the top side 204 protrude outward with respect to the center rectangular portion. The center rectangular portion of the bottom side 305 is shaped and sized to fit into the center rectangular portion of the top side 204 when the center rectangular portion of the bottom side 305 vertically align with the center rectangular portion of the top side 204. The side rectangular portions of the top side 204 are shaped and sized to fit into the side rectangular portions of the bottom side 305 of when the side rectangular portions of the top side 204 vertically align with the side rectangular portions of the bottom side 305.

Accordingly, when the first shape profile and the second shape profile are aligned in the vertical direction and mate with one another, the first power transfer components 220*a* and 220*b* and the second power transfer components 320*a* and 320*b* are aligned in the vertical direction and coupled with one another for power transfer. When appropriately aligned and stacked, the complementary shapes of the first shape profile and the second shape profile interlock, thus resisting or preventing the power storage systems 200 and 300 to move relative to one another. In some arrangements, fasteners (e.g., clutches, clamps, bolts, screws, pings, Velcro®, hooks, wires, etc.) may be added to further secure the power storage systems 200 and 300 together. The first shape profile and the second shape profile may further include guides (e.g., sloped or inclined surfaces) that guides the placement of the power storage system 300 onto the power storage system 200 so that the mating of the first shape profile and the second shape profile can properly occur.

In some examples, the first shape profile and the second shape profile are uni-directional, meaning that the first power transfer components 220*a* and 220*b* and the second power transfer components 320*a* and 320*b* are aligned when the power storage system 300 is oriented in a particular direction with respect to the power storage system 200. For instance, when the same sides (e.g., the front sides) of the power storage systems 200 and 300 face the same or parallel directions, the first shape profile and the second shape profile are aligned, and the first power transfer components 220*a* and 220*b* and the second power transfer components 320*a* and 320*b* are also aligned. As shown in FIG. 3A, the front sides 202 and 302 are arranged to face the same direction (when the power storage systems 200 and 300 are stacked), thus allowing a user to connect the power-consuming devices 102 to a same side of the stacked system. The center portions of the top side 204 and the bottom side 305, by virtue of the elongated shapes of the three rectangular portions and the positions of the power transfer components 220*a*, 220*b*, 320*a*, and 320*b*, allow the power storage systems 200 and 300 to fit (at the sides 305 and 204, without any significant gap therebetween) in the orientation noted above, but not in any other orientation.

In other examples, the first shape profile and the second shape profile are multi-directional, meaning that the first power transfer components 220*a* and 220*b* and the second power transfer components 320*a* and 320*b* are aligned when the power storage system 300 is oriented in one of two or more directions with respect to the power storage system 200. In one example, the center portion of the bottom side 305 and the center portion of the top side 204 are omitted, or the first power transfer components form concentric circles located in the center of the top side 204, and or the second power transfer components form concentric circles having corresponding size and shape located in the center of the bottom side 305. In such example, the first shape profile includes the protrusions, ridge, valleys, and channels along the edges of the top side 204 shown in FIGS. 2A, 2B, and 3A, and the second shape profile includes the protrusions, ridge, valleys, and channels along the edges of the bottom side 305 shown in FIG. 3A. In such an example, the power storage system 300 can be oriented and stacked in any of four directions with respect to the power storage system 200. In particular, the power storage system 300 can be oriented such that the front sides 202 and 302 face parallel directions, the front side 302 and the lateral side 206 face the same direction, the front side 302 and the lateral side 207 face the same direction, or the front side 302 and the back side 203 face the same direction. In other arrangements, the first shape profile and the second shape profile are bi-directional, tri-directional, or so on.

In some examples involving inductive power transfer, instead of the power transfer components 220*a*, 220*b*, 320*a*, and 320*b*, one or more coils are located on or adjacent to the top side 205, at the center thereof, and one or more coils are located on or adjacent to the bottom side 305, at the center thereof. Using the uni-directional or multi-direction stacking configurations as described herein, top side 205 and the bottom side 305 can be appropriately positioned relative to one another such that the coils on or adjacent to the top side 205 and the bottom side 305 appropriately align for inductive charging.

While FIGS. 2A-3A show the top side 205 and the bottom side 305 being used for power transfer, each of the first power transfer component 120 or the second power transfer component 125 can be located on or adjacent to any of the lateral sides, the front side, and the back side. In those examples, the power storage systems 200 and 300 may be arranged laterally adjacent or laterally abutted against each other for charging.

In some examples, the weight of the power storage system 200 is less than 40 lb. (e.g., 30-40 lb., 35-40 lb., 20-40 lb., 25-35 lb., or so on). In some examples, a length of each edge of the cube shape (e.g., horizontal dimensions, vertical dimensions, and so on) is less than 40 or 30 inches (e.g., 10-45 inches, 10-35 inches, 10-25 inches, 15 inches, 20, 25 inches, 30 inches, or so on). In particular, the length of each edge of the cube shape may be 12-27 inches (e.g., 15 inches, 20 inches, or 25 inches). Such weight and dimensions can allow single operator to carry the power storage system 200.

In some arrangements, both the first power transfer component 120 and the second power transfer component 125 can be located on a same side of the housing 101. For example, the first power transfer component 120 and the second power transfer component 125 can be separate components or a same component capable of both receiving power and providing power, and can be located on the top side 204 and/or the bottom side 205/305. This allows the power storage systems 200 and 300 to recharge each other depending on the situation via engagement of the top side 204 and the bottom side 305, without having to rearrange the configuration of the power storage systems 200 and 300.

Figure 3B:
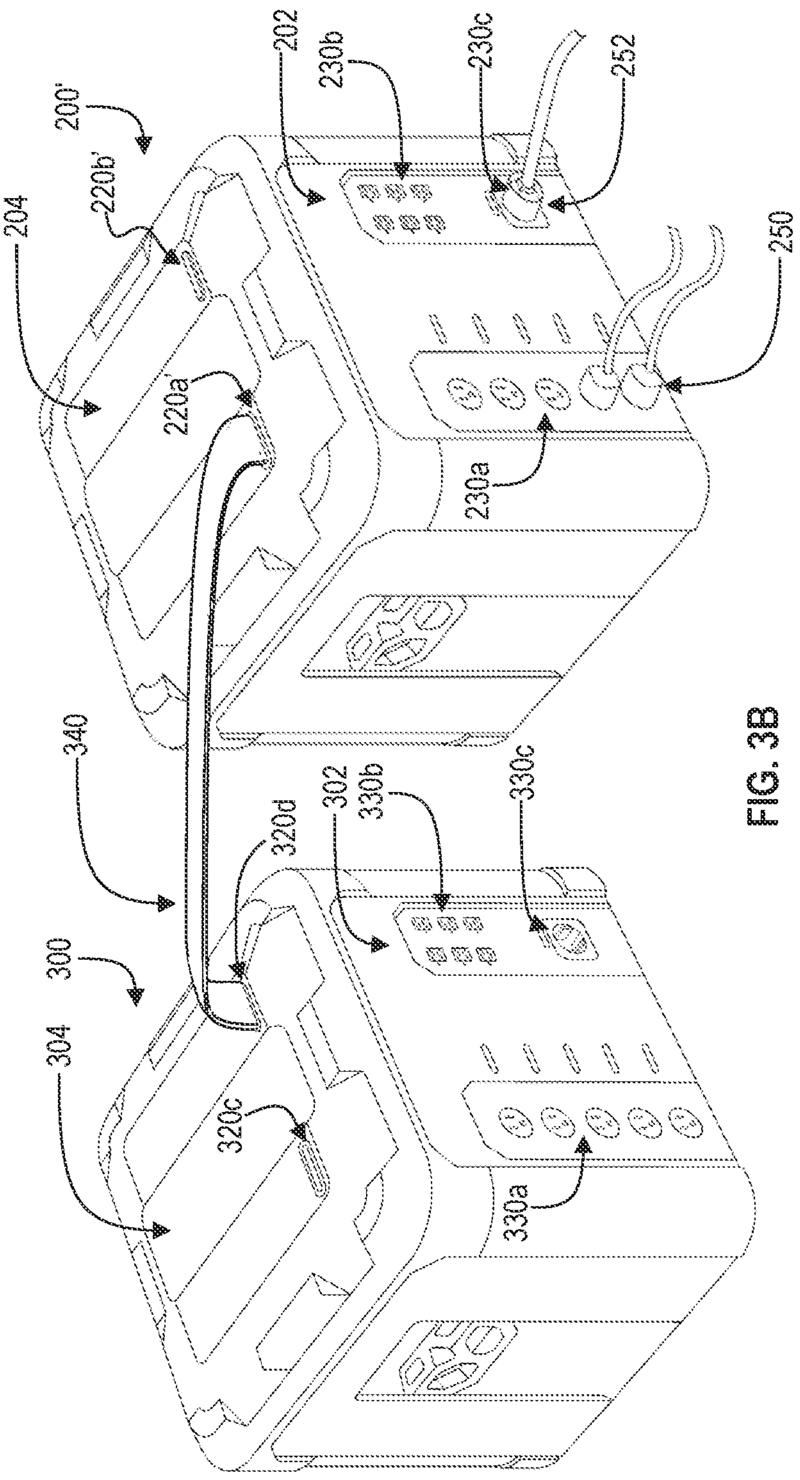
FIG. 3B shows a power transfer arrangement of two power storage system according to some implementations.

FIG. 3B shows another power transfer arrangement of two power storage systems 200' and 300 according to some implementations. Referring to FIGS. 1-3B, each of the power storage systems 200' and 300 is an example of the power storage system 100. Similar to the power storage system 200 in other aspects, the power storage systems 200' and 300 are different in that a power transfer component **220*a*' is an example of the first power transfer component 120 and a power transfer component 320*d* is an example of the second power transfer component 125, such that the power transfer component 320*d* can transfer power to the power transfer component 220*a*'. In one example, a power transfer component 220*b*' is an example of the second power transfer component 125, and a power transfer component 320*c* is an example of the first power transfer component 120, such that each of the power storage systems 200'/300 have both the first and power transfer components 120 and 125 on the same top side 204/304. In another example, the power transfer component 220*b*' is an example of the first power transfer component 120, and the power transfer component 320*c* is an example of the second power transfer component 125. The front side 302 includes power output devices 330*a*, 330*b*, and 330*c* similar to respective ones of the power output devices 230*a*, 230*b*, and 230*c***.

Instead of being arranged in a stacked configuration as shown in FIG. 3A, to charge the power storage system 200' using the power storage system 300, the power storage systems 200' and 300 can be placed side-by-side (e.g., on a support surface such as the ground) and connected to each via a connection 340. In the example in which the power storage system 200' is the power storage system 100 and the power storage system 300 is the power source 121, the connection 340 is an example of the connection 122. In the example in which the power storage system 300 is the power storage system 100 and the power storage system 200' is the power storage system 103, the connection 340 is an example of the connection 127. Examples of the connection include but are not limited to, a cable. the cable 340 is shaped and sized to connect to, mate with, attach to, or otherwise operatively coupled to the power transfer component **320*d* on one end and shaped and sized to connect to, mate with, attach to, or otherwise operatively coupled to the power transfer component 220*a*' on the other end to facilitate transfer of power from the power storage component 320*d* to the power transfer component 220*a*'**.

In the configuration shown in FIG. 3B, the power storage system 200' can be disconnected from the power consuming devices 102 (e.g., from the connector connections 250 and 252) by an operator and allow the power storage system 300 to take over the role of powering the power consuming devices 102. For example, the operator can detach the connector connections 250 and 252 from the power output devices **230*a* and 230*c* and attach the connector connections 250 and 252 to the power output devices 330*a*, 330*b*, and 330*c*. This would allow the depleted power storage system 200' to be easily removed by the operator, without having to first remove the power storage system 300 as is the case with the stacked configuration shown in FIG. 3A. The power storage system 200' can be recharged by a power source 121** at another location following the removal.

Figure 3C:
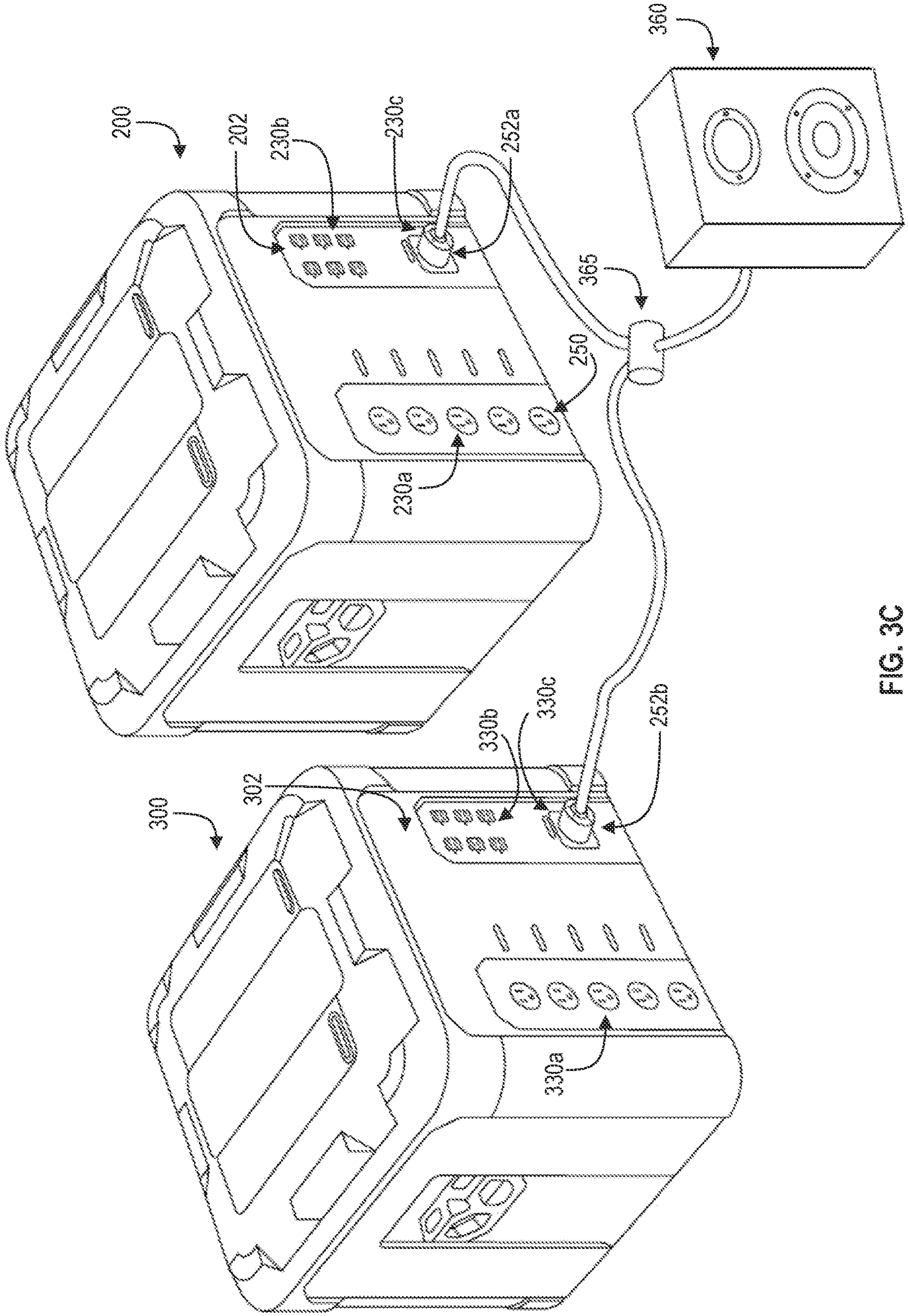
FIG. 3C shows a power transfer arrangement of two power storage system according to some implementations.

FIG. 3C shows another power transfer arrangement of two power storage systems 200 and 300 according to some implementations. Referring to FIGS. 1-3C, each of the power storage systems 200 and 300 is an example of the power storage system 100 as described. A device 360 (e.g., a speaker) is an example of the power-consuming devices 102. An example of the connection 105 includes a splitter 365 and connectors **252*a* and 252*b*. Each of the connectors 252*a* and 252*b* is a connector such as but not limited to, the connector 252. Each of the connectors 252*a* and 252*b* is connected to the splitter 365 via a cable. The splitter 365 is connected to the device 360 to provide power to the device 360**.

Initially, the power storage system 200 is connected to the device 360 via the connector **252*a* and the splitter 365, to provide power to the device 360 via a path defined by the connector 252*a* and the splitter 365. An operator can plug the connector 252*a* into the output device 230*c*. As the power level of the power storage system 200 becomes low, the power storage system 300 can be placed adjacent to the power storage system 200. The operator can plug the connector 252*b* into the output device 330*c*, such that the power storage system 300 is connected to the device 360 via the connector 252*b* and the splitter 365, to provide power to the device 360 via a path defined by the connector 252*b* and the splitter 365. This allows the power storage system 200 to be unplugged from the connector 252*a* and removed (e.g., to be charged as described herein) without interrupting the power supply to the electrical load (e.g., the device 360). This is known as "hot-swapping." For example, the splitter 365 may be a splitter cable with connectors 252*a* and 252*b* capable of being attached to both power storage systems 200 and 300. In some examples, the splitter 365** is a power O-ring device which facilitates the uninterrupted power change.

Figure 4:
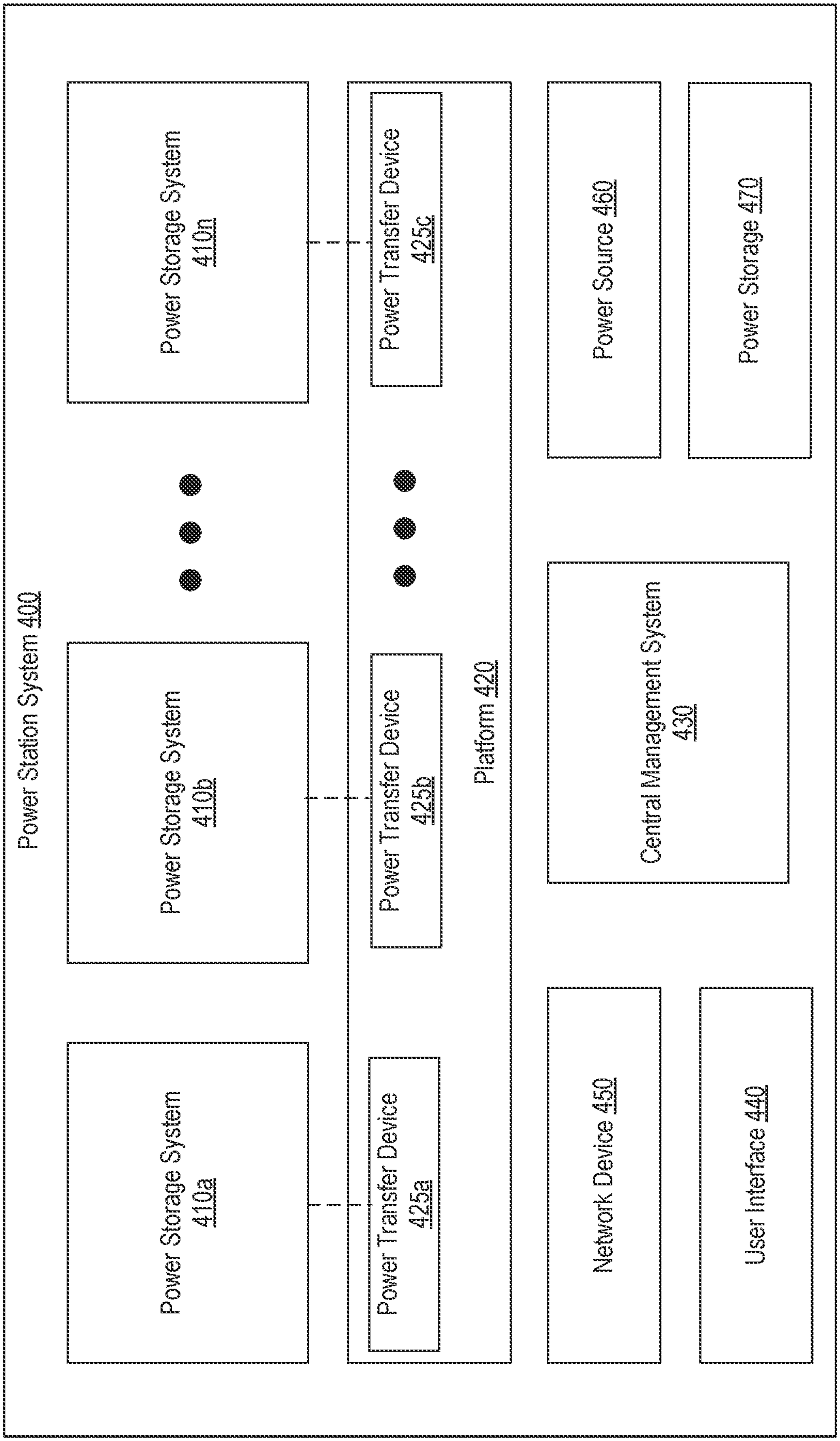
FIG. 4 is a diagram illustrating a power station system according to some implementations.

FIG. 4 is a diagram illustrating a power station system 400 according to some implementations. Referring to FIGS. 1-4, the power station system 400 can receive, store, recharge, and transport the power storage systems **410*a*, 410*b*, . . . , 410*n*, each of which can be a power storage system 100, 200, or 300**.

In some implantation, the power station system 400 includes a platform 420 having suitable structure for receiving, storing, securing, and recharging the power storage systems **410*a*, 410*b*, . . . , 410*n*. The platform 420 may include one or more racks, cabinets, trunks, slots or space sized and shaped to receive and store the power storage systems 410***a*, 410*b*, . . . , 410*n*. The platform 420 can also include mechanical fastener such as clutches, clamps, bolts, screws, pings, Velcro®, hooks, wires, flanges, etc. for securing the power storage systems 410*a*, 410*b*, . . . , 410*n* to the platform 420 during transport. The platform 420 includes or is operatively coupled to one or more power transfer devices 425*a*, 425*b*, . . . , 425*n*. Each of the power transfer devices 425*a*, 425*b*, . . . , 425 can be removably coupled to a respective one of the power storage systems 410*a*, 410*b*, . . . , 410*n* to receive power from the respective one of the power storage systems 410*a*, 410*b*, . . . , 410*n* and/or to transfer power to the respective one of the power storage systems 410*a*, 410*b*, . . . , 410*n*.

The platform 420 may be coupled to a power source 460, which can be one or more solar panels, wind turbines, connections to an electrical power grid, battery packs, capacitors, etc. In some arrangements, the platform 420 may be coupled to at least one power storage 470. The power storage 470 stores and provides electric power. In some implementations, the power storage 470 includes one or more rechargeable battery packs, e.g., Lithium ion or Lithium ion polymer battery packs. Each battery pack can store up to a defined amount of electric power, for example, but not limited to 3 KW of electric power. In other examples, each battery pack may store up to any other suitable amount of electric power. In some examples, a battery pack can include other types of rechargeable batteries, such as nickel-metal hydride batteries, nickel-iron batteries, and so on. In some implementations, the power storage 470 can include capacitors (e.g., supercapacitors, ultracapacitors, and so on) or other suitable rechargeable power storage devices. In other examples, the power storage 470 may include other types of power source, such as fuel cells (e.g., hydrogen fuel cells). The power storage 470 represents the power station system 400's own bank of batteries that can be used to either recharge the individual power storage systems 410*a*-410*n* or provide large amounts of energy to one or more power-consuming devices 102. In that regard, the platform 420 may further include the power output device 130 configured to power the power-consuming devices 102 via the connection 105.

The platform 420 can provide the power stored in the power source 460 and/or the power storage 470 to one or more of the power storage systems 410*a*, 410*b*, . . . , 410*n* via the power transfer devices 425*a*-425*n*. Each of the power transfer devices 425*a*-425*n* includes a suitable device for wireless (e.g., inductive) or wired (e.g., conductive) transfer of power. In some examples, each of the power transfer devices 425*a*-425*n* includes an inductive charging unit having one or more coils such that when appropriately positioned (aligned) with respect to one or more coils of the first power transfer component 120 of one of the power storage system 410*a*, 410*b*, . . . , 410*n*, provides or transfers electric power to the one or more coils of or operatively coupled to the first power transfer component 120 of the one of the power storage system 410*a*, 410*b*, . . . , 410*n* via induction. In some examples, each of the power transfer devices 425*a*-425*n* includes a connector having one or more contact surfaces such that when appropriately positioned to physically contact the one or more contact surfaces of a connector of or operatively coupled to the first power transfer component 120 of one of the power storage system 410*a*, 410*b*, . . . , 410*n*, provides or transfers power to the one or more contact surfaces of the connector of or operatively coupled to the first power transfer component 120 of the one of the power storage system 410*a*, 410*b*, . . . , 410*n* via conduction. In that regard, each of the power transfer devices 425*a*-425*n* is similar to the second power transfer component 125.

In some arrangements, the platform 420 can draw or receive power from the power storage systems 410*a*, 410*b*, . . . , 410*n* via the power transfer devices 425*a*-425*n*, for example, to charge the power source 460. In some examples, each of the power transfer devices 425*a*-425*n* includes an inductive charging unit having one or more coils such that when appropriately positioned (aligned) with respect to one or more coils of the first power transfer component 120 of one of the power storage systems 410*a*, 410*b*, . . . , 410*n*, receives electric power from the one or more coils of or operatively coupled to the first power transfer component 120 of the one of the power storage systems 410*a*, 410*b*, . . . , 410*n* via induction, when the power storage systems 410*a*, 410*b*, . . . 410*n* are received in the one or more racks, cabinets, trunks, slots or space of the platform 420. In some examples, each of the power transfer devices 425*a*-425*n* includes a connector having one or more contact surfaces such that when appropriately positioned to physically contact the one or more contact surfaces of a connector of or operatively coupled to the first power transfer component 120 of one of the power storage systems 410*a*, 410*b*, . . . , 410*n*, receives power from the one or more contact surfaces of the connector of or operatively coupled to the first power transfer component 120 of the one of the power storage systems 410*a*, 410*b*, . . . , 410*n* via conduction. In that regard, each of the power transfer devices 425*a*-425*n* is similar to the first power transfer component 120. In some arrangements, each of the power transfer devices 425*a*-425*n* includes or is operatively coupled to a cable or a wired connection such as but not limited to the connection 340, which can be removably attached to the first power transfer component 120 of each of the power storage systems 410*a*, 410*b*, . . . , 410*n* similar to described with respect to FIG. 3B to transfer power to each of the power storage systems 410*a*, 410*b*, . . . , 410*n*.

The power station system 400 can include a network device 440 for communicating with the power storage systems 410*a*-410*n*, when the power storage systems 410*a*-410*n* are stored on or within the platform 420 and when the power storage systems 410*a*-410*n* are deployed to charge the power-consuming devices 102. The network device 450 may be configured to communicate wirelessly with a network, such as via Wi-Fi, Bluetooth, NFC, Zigbee, IR, RF, cellular (3G, 4G, LTE, 5G), etc. In other examples, the network device 450 may communicate with the network via a wired connection, such as via Ethernet, a LAN, a WAN, Firewire, USB, or other applicable wired interface. The network device 450 can receive the status information (e.g., charging status, power remaining, battery health, and so on) from the network device 150 and the current location from the tracking device 160 over one or more networks from each power storage system 410*a*, and provide the status information and the current location to the central management system 430 for processing. The central management system 430 can determine commands (e.g., turn-off, start, sleep, etc.) based on user input received from the user interface 440 and send such commands to the network device 150 via the network device 450.

The central management system 430 can cause the user interface 440 to display various types of information relating to the power storage systems 410*a*-410*n*, including the status information and the current location of each of the power storage systems 410*a*-410*n*. The user interface 440 can include display devices such as LCD, LED, CRT, plasma, or other such digital displays, projection-based monitors, touchscreens, and so on. In some arrangements, the user interface 440 can include speakers. In some arrangements, the user interface 440 can include input devices for receiving user commands. Examples of the input device include keyboard, mouse, touchscreen, microphone, and so on.

In some examples, the central management system 430, the user interface 440, and the network device 450 are located on or within the power station system 400. In some examples, the central management system 430, the user interface 440, and the network device 450 are located on or within the power station system 400 are realized using a separate device, such as a computing system, server, smart phone, etc. of the operator.

The central management system 430 is operatively coupled to the power source 460 to manage or regulate the transfer of electrical power from the power source 460 to the power storage systems 410*a*-410*n* and from the power storage systems 410*a*-410*n* to the power source 460. Thus, the central management system 430 is operatively connected to the power transfer devices 425*a*-425*n*, the power source 460, the network device 450, and the user interface 440. In particular, the central management system 430 includes suitable components (e.g., controllers, micro-controllers, charge regulators, charge controllers, voltage regulators, inverters, surge protectors, and so on) that regulates the current and voltage of power flowing into and out of power storage systems 410*a*-410*n* and the power source 460.

Figure 5A:
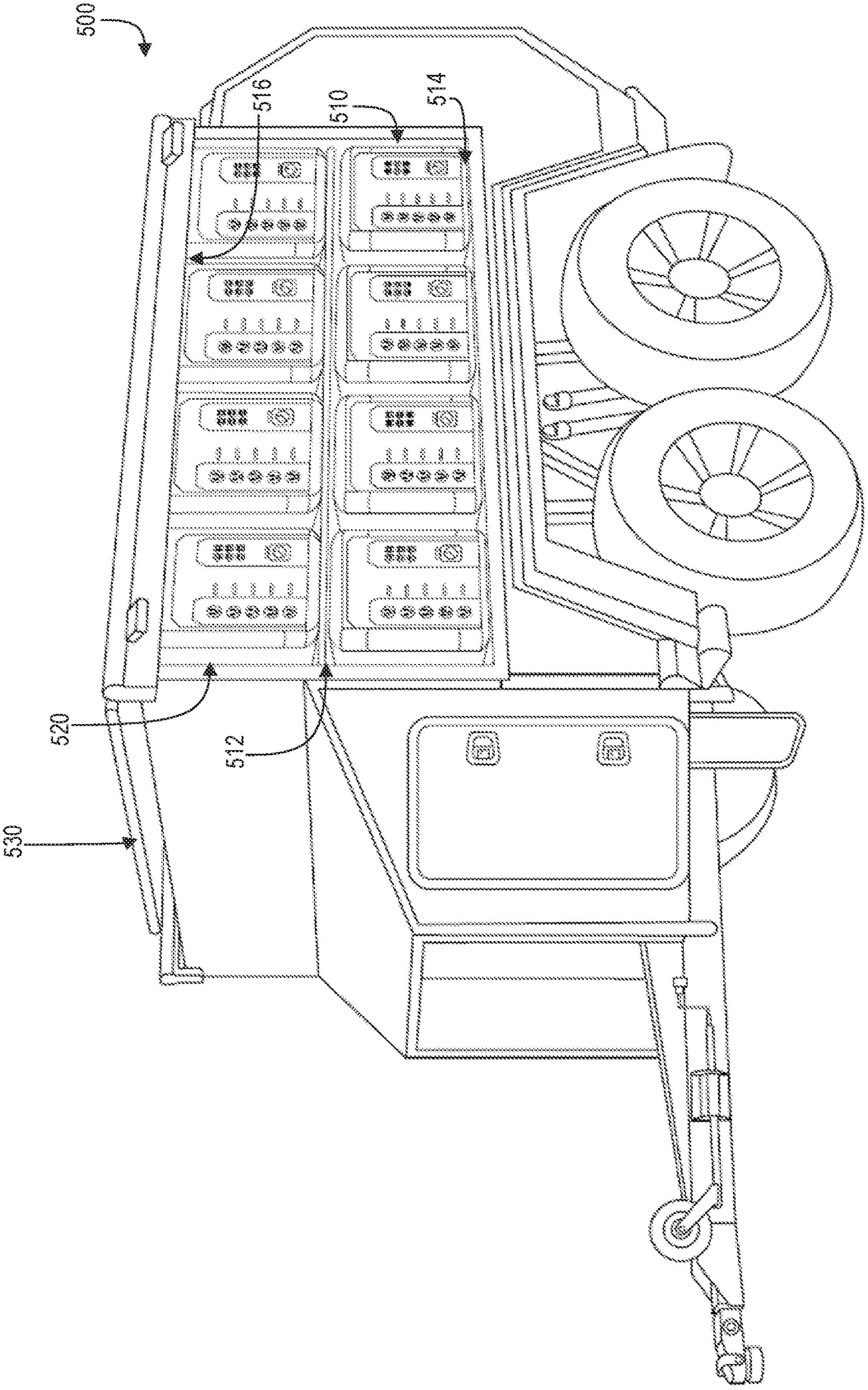
FIG. 5A shows a perspective view of a power station system according to some implementations.
Figure 5B:
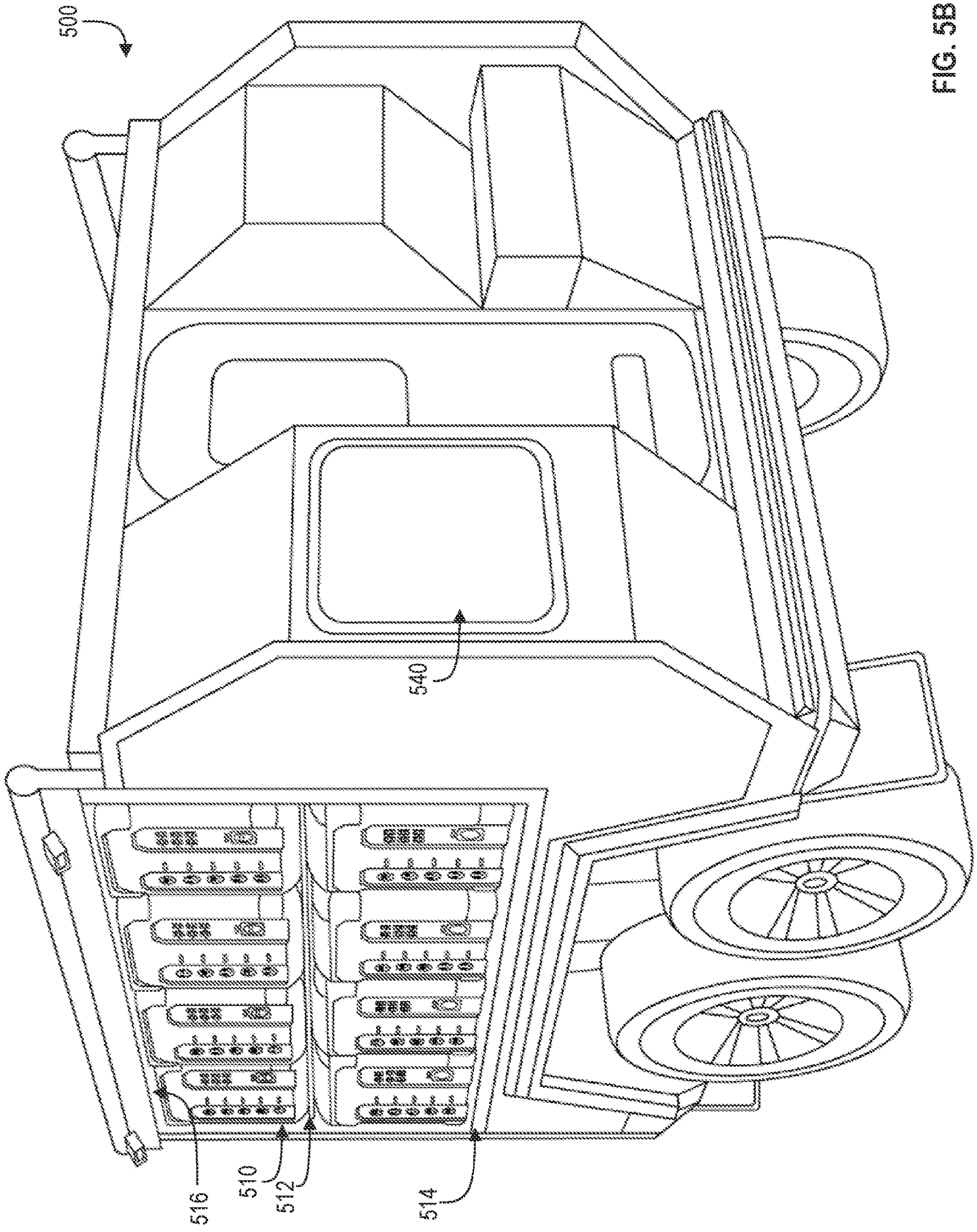
FIG. 5B shows a perspective view of a power station system according to some implementations.

FIG. 5A shows a first perspective view of a power station system 500 according to some implementations. FIG. 5B shows a second perspective view of the power station system 500 according to some implementations. Referring to FIGS. 1-5B, the power station system 500 is an example implementation of the power station system 400.

As shown, the power station system 500 is a trailer (which can be pulled by a vehicle). In some examples, the power station system 500 can be a vehicle (e.g., powered using the power source 460 such as an electric vehicle). Therefore, an operator can move the power station system 500 to desired positions.

The power station system 500 includes a platform 520 for storing, securing, and recharging the power storage systems 510. Each of the power storage systems 510 can be a power storage system 100, 200, 300, or 410*a*-410*n*. The platform 520 is a particular implementation of the platform 420. The platform 520 defines slots on either side of the power station system 500 for storing the power storage systems 510. Although eight power storage systems 510 are shown to be stored in the platform 520 on one side of the power station system 500, any number of power storage systems 510 can be stored in the platform 520. An operator can place the power storage systems 510 in the slots of the platform 520 and retrieve the power storage systems 510 from those slots.

As shown, the platform 520 include a first rack 512, a second rack 514, and a ceiling 516. Some of the power storage systems 510 are stored in the space (e.g., slots) defined by the first rack 512 and the second rack 514, and some of the power storage systems 510 are stored in the space (e.g., slots) defined by the first rack 512 and the ceiling 516.

In some implementations, a surface of the first rack facing 512 the ceiling 516 includes first power transfer components similar to the power transfer component 120, where each power transfer component is configured to receiving electric power from the second power transfer component 125 of each of the power storage systems 510 stored between the first rack 512 and the ceiling 516. Such power transfer components include the first shape profile or pattern similar to that of the top side 204. When appropriately aligned and stacked, the complementary shapes of the first shape profile and the second shape profile of the bottom side 305 interlock, thus resisting or preventing the power storage systems 510 to move relative to the first rack 512. In some arrangements, fasteners (e.g., clutches, clamps, bolts, screws, pings, Velcro®, hooks, wires, etc.) may be added to further secure the power storage systems 510 to the first rack 512. The first shape profile may further include guides (e.g., sloped or inclined surfaces) that guides the placement of the power storage systems 510 onto the first rack 512 so that the mating of the first shape profile and the second shape profile can properly occur. In some examples, a surface of the second rack 514 facing the first rack 512 also includes first power transfer components similar to the power transfer component 120 and the first shape profile or patterns.

In some implementations, a surface of the ceiling 516 facing the first rack 512 includes second power transfer components similar to the power transfer component 125, where each power transfer component is configured to provide electric power to the first power transfer component 120 of each of the power storage systems 510 stored between the first rack 512 and the ceiling 516. Such power transfer components include the second shape profile or pattern similar to that of the bottom side 305. When appropriately aligned and stacked, the complementary shapes of the first shape profile of the top side 204 and the second shape profile interlock, thus resisting or preventing the power storage systems 510 to move relative to the ceiling 516. In some arrangements, fasteners (e.g., clutches, clamps, bolts, screws, pings, Velcro®, hooks, wires, etc.) may be added to further secure the power storage systems 510 to the ceiling 516. The first shape profile may further include guides (e.g., sloped or inclined surfaces) that guides the placement of the power storage systems 510 onto the ceiling 516 so that the mating of the first shape profile and the second shape profile can properly occur. In some examples, a surface of the first rack 512 facing the second rack 514 also includes second power transfer components similar to the power transfer component 125 and the second shape profile or patterns.

The power transfer devices 425*a*-425*n* correspond to the first power transfer component and the second power transfer components on the first rack 512, the second rack 514, and the ceiling 516. In some examples, both the first power transfer component 120 and the second power transfer component 125 are located on the bottom side 205/305 of the power storage systems 510. In such examples, the first rack 512 includes the first power transfer component to couple with the second transfer component 125 of each power storage system 510 (stored between the first rack 512 and the ceiling 516) as well as the second power transfer component to couple with the first transfer component 120 of each of each power storage system 510 (stored between the first rack 512 and the ceiling 516). Similarly, the second rack 514 includes the first power transfer component to couple with the second transfer component 125 of each power storage system 510 (stored between the first rack 512 and the ceiling) as well as the second power transfer component to couple with the first transfer component 120 of each of each power storage system 510 (stored between the first rack 512 and second rack 514).

In some examples, one or both of the first transfer component 120 and the second transfer component 125 are located on the back side 203 of each power storage system 510. In such examples, the platform 520 includes sides and surfaces facing the back side s203 of the power storage systems 510 when the power storage systems 510 are stored in the platform 520. Such sides of the platform 520 can include respective first and/or second transfer components to engage, mate, or couple the one or both of the first transfer components 120 and the second transfer components 125 of the power storage systems 510 to provide power to the power storage systems 510 or receive power from the power storage systems 510.

In some examples, the power station system 500 further includes a solar panel 530, which is a particular implementation of the power source 460. As shown, the solar panel 530 is located on a roof of the trailer, although the solar panel 530 can also be located on the sides of the trailer (e.g., on an exterior surface of a door covering the slots). The solar panel 530 is connected to the second power transfer component of the platform 520. In some examples, instead of a solar panel 530, the power source 460 can also be a wind turbine located on the roof of the trailer.

The touchscreen 540 is a particular example of the user interface 440. The touchscreen 540 can receive the status information and the location information of each of the power storage systems 510 from the central management system 430 and display the same to the operator.

Accordingly, the arrangements disclosed herein allow zero emission (carbon-neutral) power station systems. Such power station system allow for reduction in setup and teardown labor, insurance premiums, operating costs, and maintenance. Such power station systems require fewer cables, are weatherproof and scalable.

Figure 6:
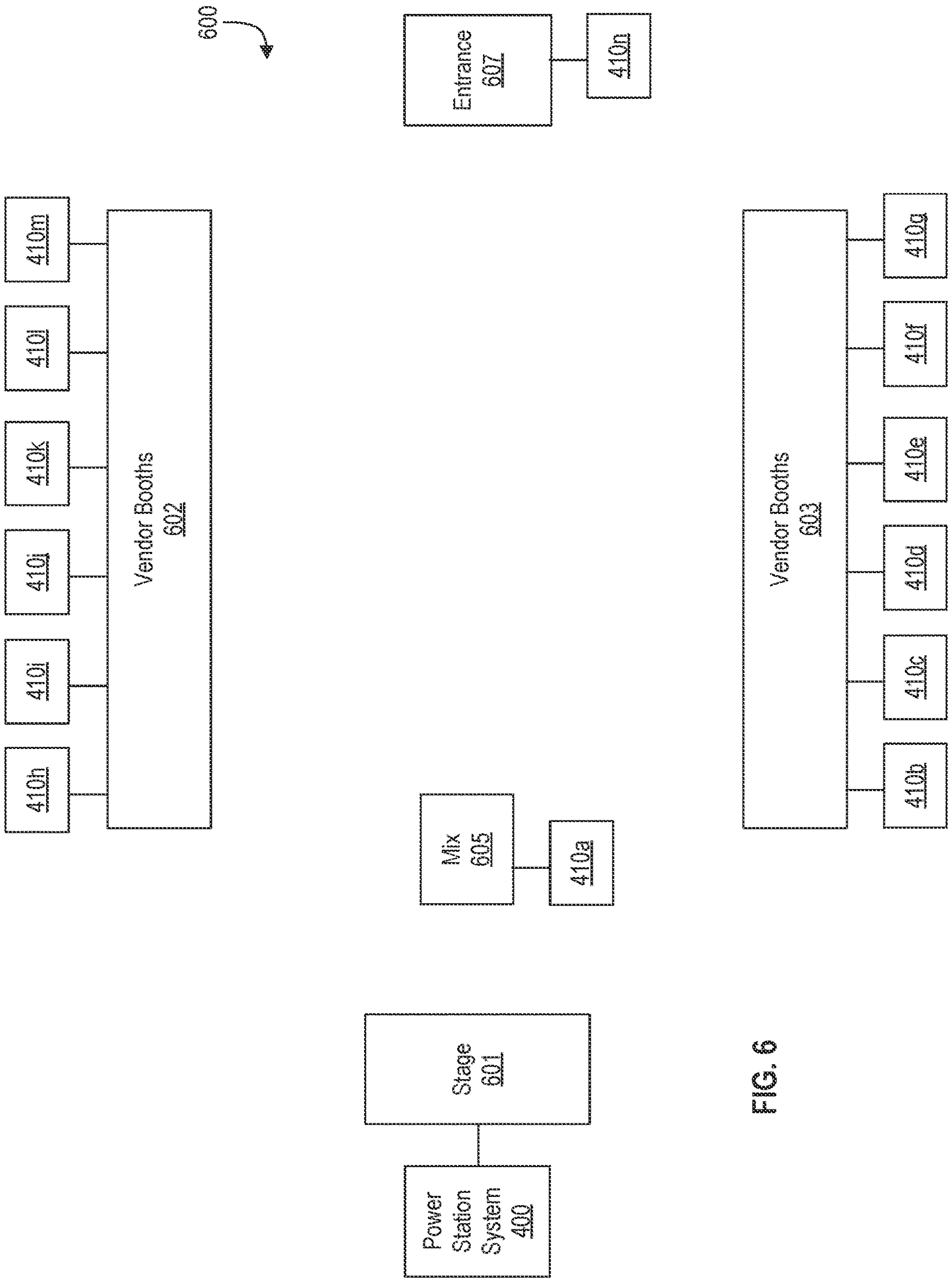
FIG. 6 is a diagram illustrating a deployment of a power station system and power storage systems according to some implementations.

FIG. 6 is a diagram illustrating a deployment 600 of the power station system 400 and the power storage systems 410*a*-410*n* according to some implementations. Referring to FIGS. 1-6, the deployment 600 corresponds to a music festival scenario, in which a stage 601 (e.g., lighting, speakers, curtains, and so on), a mix stand 605 (e.g., electric music instruments, lighting, speakers, and so on), vendor booths 602 and 603 (e.g., lighting, cooking equipment, and so on), and an entrance 607 (e.g., lighting, security equipment, and so on) have the power-consuming devices 102.

As shown, the power station system 400 (e.g., the trailer 500) can be parked next to the stage 601, which may require the largest amount of power. The power source 460 and any power storage systems remaining on the power station system 400 can be used to power the power-consuming devices 102 on the stage 601. The power storage system 410*a* can be moved by an operator adjacent to the mix stand 605 to power the power-consuming devices 102 in the mix stand 605. The power storage systems 410*b*-410*g* can be moved by an operator adjacent to the vendor booths 603 to power the power-consuming devices 102 in the vendor booths 603. The power storage systems 410*h*-410*m* can be moved by an operator adjacent to the vendor booths 602 to power the power-consuming devices 102 in the vendor booths 602. The power storage system 410*n* can be moved by an operator adjacent to the entrance 607 to power the power-consuming devices 102 in the entrance 607. If any one of the power storage systems 410*b*-410*n* are low on power, the operator can move another power storage system out of the power station system 400 to recharge the power storage system that is low on power.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A power storage system, comprising:

a first power storage device configured to store electric power, the first power storage device comprising:

a first battery;

a first power output component operatively coupled to the first power storage device, wherein the first power output component is configured to provide electric power stored in the first power storage device to one or more power-consuming devices; and a first power transfer component configured to receive electric power from a second power storage device;

the second power storage device configured to store electric power, the second power storage device comprising:

a second battery;

a second power output component operatively coupled to the second power storage device, wherein the second power output component is configured to provide electric power stored in the second power storage device to one or more power-consuming devices; and a second power transfer component configured to transfer electric power stored in the second power storage device to the first power transfer component of the first power storage device.

2. The power storage system of claim 1, wherein the power storage system further comprises a housing structurally supporting the first power storage device, the second power storage device, the power output device, the first power transfer component, and the second power transfer component;

the power storage is rechargeable; and the power storage comprises one or more battery packs.

3. The power storage system of claim 1, wherein the housing comprises at least a first side and a second side;

the first side and the second side are different sides of the housing;

the first power transfer component is located on, adjacent to, or exposed from the first side; and the second power transfer component is located on, adjacent to, or exposed from the second side.

4. The power storage system of claim 3, wherein at least one of:

the first side and the second side are opposite sides of the housing;

the first side and the second side face opposite directions;

the first power transfer component and the second power transfer component face different directions; or the first power transfer component and the second power transfer component face opposite directions.

5. The power storage system of claim 3, wherein the housing further comprises a third side;

the first side, the second side, and the third side are different sides of the housing; and the power output device is located on, adjacent to, or exposed from the third side.

6. The power storage system of claim 5, wherein at least one of:

two of the first side, the second side, and the third side are opposite sides of the housing; two of the first side, the second side, and the third side face opposite directions;

the first power transfer component, the second power transfer component, and the power output device face different directions; or two of the first power transfer component, the second power transfer component, and the power output device face opposite directions.

7. The power storage system of claim 3, wherein the first side comprises a first shape profile; and the second side has a second shape profile;

wherein the first shape profile is configured to engage the second shape profile on a side of another power storage device.

8. The power storage system of claim 7, wherein the second shape profile is configured to engage the first shape profile on a side of another power storage device.

9. The power storage system of claim 7, wherein each of the first shape profile or the second shape profile comprises at least one of:

one or more ribs;

one or more ridges;

one or more protrusions;

one or more elevated surfaces;

one or more depressed surfaces;

one or more channels;

one or more valleys;

one or more curves;

one or more arcs;

one or more convex sections; or one or more concave sections.

10. The power storage system of claim 3, wherein the housing has a cube shape and wherein the first side and the second side are opposite sides of the cube shape.

11. A power storage system, comprising:

a first power storage device configured to store electric power, the first power storage device comprising:

a first battery;

a first power output component operatively coupled to the first power storage device, wherein the first power output component is configured to provide electric power stored in the first power storage device to one or more power-consuming devices; and a first power transfer component configured to receive electric power from a second power storage device or transfer electric power stored in the first power storage device to the second power storage device; and the second power storage device configured to store electric power, the second power storage device comprising:

a second battery;

a second power output component operatively coupled to the second power storage device, wherein the second power output component is configured to provide electric power stored in the second power storage device to one or more power-consuming devices; and a second power transfer component configured to transfer electric power stored in the second power storage device to the first power storage device or to receive electrical power from the first power transfer component of the first power storage device.

12. A power storage system, comprising:

a first power storage device configured to store electric power, the first power storage device comprising:

a first battery;

a first power output component operatively coupled to the first power storage device, wherein the first power output component is configured to provide electric power stored in the first power storage device to one or more power-consuming devices; and a first power transfer component configured to receive electric power from a second power storage device;

the second power storage device configured to store electric power, the second power storage device comprising:

a second battery;

a second power output component operatively coupled to the second power storage device, wherein the second power output component is configured to provide electric power stored in the second power storage device to one or more power-consuming devices; and a second power transfer component configured to transfer electric power stored in the second power storage device to the first power transfer component of the first power storage device;

wherein the system is configured to enable recharging between the first and second power storage devices without requiring an external power source; and wherein the system is further configured to simultaneously provide power to one or more power-consuming devices via at least one of the first power output components and the second power output components while transferring power between the first and second power storage devices.

* * * * *